(12) United States Patent
Uemoto

(10) Patent No.: US 8,770,053 B2
(45) Date of Patent: Jul. 8, 2014

(54) TRANSMISSION DEVICE

(75) Inventor: Takafumi Uemoto, Nara (JP)

(73) Assignee: JTEKT Corporation, Osaka (JP)

( * ) Notice: Subject to any disclaimer, the term of this patent is extended or adjusted under 35 U.S.C. 154(b) by 147 days.

(21) Appl. No.: 13/581,154

(22) PCT Filed: Feb. 23, 2011

(86) PCT No.: PCT/JP2011/053894
§ 371 (c)(1),
(2), (4) Date: Aug. 24, 2012

(87) PCT Pub. No.: WO2011/105387
PCT Pub. Date: Sep. 1, 2011

(65) Prior Publication Data
US 2012/0318089 A1    Dec. 20, 2012

(30) Foreign Application Priority Data

Feb. 24, 2010 (JP) ................... 2010-038240

(51) Int. Cl.
*B60W 10/08* (2006.01)
*B60W 10/10* (2012.01)

(52) U.S. Cl.
USPC .............................. 74/335; 477/15; 477/110

(58) Field of Classification Search
USPC ............................ 74/335; 477/8, 15, 107, 110
See application file for complete search history.

(56) References Cited

U.S. PATENT DOCUMENTS

| | | | |
|---|---|---|---|
| 4,565,106 A * | 1/1986 | Sumiyoshi | 74/359 |
| 5,507,196 A * | 4/1996 | Bailly et al. | 74/335 |
| 5,689,997 A * | 11/1997 | Schaller | 74/335 |
| 5,743,143 A * | 4/1998 | Carpenter et al. | 74/335 |
| 5,823,053 A | 10/1998 | Stengel et al. | |
| 5,901,608 A | 5/1999 | Takeyama | |
| 6,334,371 B1 | 1/2002 | Stengel et al. | |
| 2004/0250642 A1 | 12/2004 | Ichikawa et al. | |
| 2005/0139024 A1 | 6/2005 | Chen | |
| 2012/0144942 A1 | 6/2012 | Yukitake et al. | |

FOREIGN PATENT DOCUMENTS

| | | |
|---|---|---|
| DE | 199 33 499 A1 | 1/2000 |
| EP | 1 452 780 A2 | 9/2004 |
| JP | A-10-148256 | 6/1998 |
| JP | A-2000-035127 | 2/2000 |
| JP | A-2001-514367 | 9/2001 |
| JP | A-2009-050058 | 3/2009 |
| WO | WO 2005/057051 A1 | 6/2005 |

OTHER PUBLICATIONS

International Search Report issued in Application No. PCT/JP2011/053894; Dated May 10, 2011.
European Search Report issued in Application No. 11747348.8; Dated Oct. 15, 2013.

* cited by examiner

*Primary Examiner* — Ha D Ho
(74) *Attorney, Agent, or Firm* — Oliff PLC

(57) ABSTRACT

A transmission has a simple structure and can be produced at a low cost. A second electromagnetic clutch is shut off at a timing when an electric motor is decelerated and before selecting motion is finished, and thereafter, a shift/select shaft is moved to a terminal end position of the selecting motion with an inertia of a driven part (a second output hub) of the second electromagnetic clutch. At a timing after a predetermined period has passed from the timing, a first electromagnetic clutch for the next shifting motion is connected. The electric motor is driven synchronously with the end of the selecting motion or immediately in response to the end, thereby to start the next shifting motion. In this manner, gear change can be rapidly conducted.

8 Claims, 6 Drawing Sheets

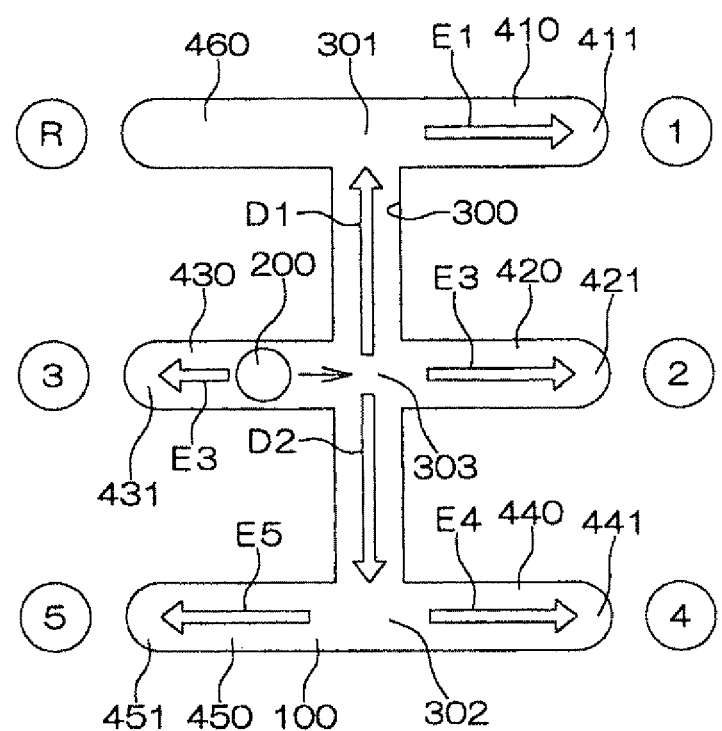

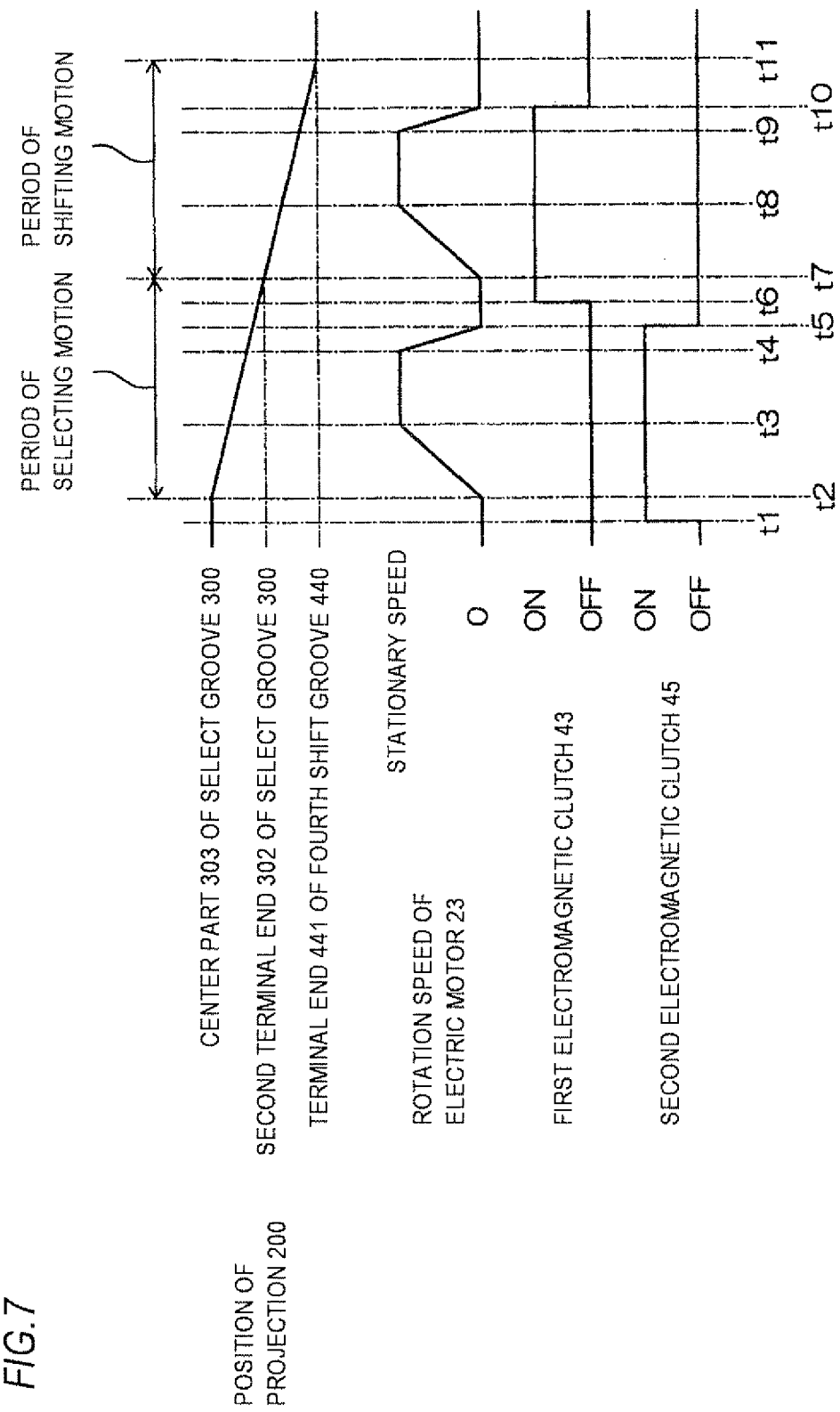

TRANSMISSION DEVICE

TECHNICAL FIELD

The present invention relates to a transmission device which performs shifting motion and selecting motion, using a driving power of an electric motor.

BACKGROUND ART

A transmission device of an automatically controlled manual transmission type (Auto Manual Transmission) in which a clutch of the manual transmission is automated has been heretofore known.

For example, in a transmission device disclosed in Patent Document 1, a guide pin projecting in a radial direction from a shift operating member is guided by a stationary shift guiding board which is formed according to a shift pattern of a main operating lever. In this manner, switching operation between the shifting motion and the selecting motion is performed only at a position prescribed by an internal structure of the transmission device.

PRIOR ART DOCUMENT

Patent Document

Patent Document 1: JP-A-2001-514367

SUMMARY OF THE INVENTION

Problems that the Invention is to Solve

In Patent Document 1, a motor for driving the shift operating member and a selection operating member, and a motor for switching between the shifting motion and the selecting motion are used. Because the two motors are used as described above, there has been such a problem that a structure of the transmission device is complicated and a production cost is increased.

The present invention has been made in view of the above described problem, and an object of the invention is to provide a transmission device which has a simple structure and can be produced at a low cost.

Means for Solving the Problems

In order to achieve the above described object, there is provided in an embodiment according to the invention, a transmission device (1) comprising: a single electric motor (23); clutches (43, 45) capable of connecting or shutting off power transmission from the electric motor; a controller (88) configured to control motions of the electric motor and the clutches; a shift/select shaft (11) configured to be rotated around its center axis (C1) thereby to perform a shifting motion, and configured to be moved in an axial direction (X1) thereby to perform a selecting motion; a first driving power transmitting mechanism (24) configured to allow the shift/select shaft to perform the shifting motion using a power from the electric motor via one of the clutches; a second driving power transmitting mechanism (25) configured to allow the shift/select shaft to perform the selecting motion using a power from the electric motor via the other of the clutches; and a guiding mechanism (G) configured to guide the selecting motion and the shifting motion of the shift/select shaft up to respective terminal end positions, wherein the controller shuts off the clutch at a predetermined timing when the electric motor is decelerated and before the shift/select shaft arrives at the terminal end position of one of the shifting motion and the selecting motion, and moves the shift/select shaft up to the terminal end position of the one of the shifting motion and the selecting motion with an inertia of a driven part (50, 53) of the clutch.

According to the embodiment of the invention, for example, the clutch is shut off while the electric motor is decelerated and before the selecting motion is finished, and thereafter, the shift/select shaft is moved to the terminal end position of the selecting motion with the inertia of the driven part (an output hub, for example) of the clutch. Therefore, it is possible to connect the clutch for the next shifting motion, before the selecting motion is finished, and hence, it is possible to start the next shifting motion, by driving the electric motor immediately after the selecting motion is finished. Because the shifting motion and the selecting motion can be performed using the single electric motor, it is possible to simplify the structure of the transmission device and to reduce the production cost. Even though the single electric motor is used as described above, the time required for switching operation between the selecting motion and the shifting motion can be reduced, and it is possible to proceed to the next motion at an early time.

Moreover, in some cases, the transmission device further comprises a housing (33) containing at least a part of the shift/select shaft, the guiding mechanism includes a projection (200) which is projected from one of an outer periphery (11a) of the shift/select shaft and an inner face (33a) of the housing, and a groove (100) which is provided on the other of the outer periphery (11a) of the shift/select shaft and the inner face (33a) of the housing and which is configured to guide the projection or configured to be guided by the projection, and the groove includes a select groove (300) extending in parallel with the shift/select shaft and having a pair of terminal ends (301, 302), and a plurality of shift grooves (410, 420, 430, 440, 450) extending transversely from the select groove and having respective terminal ends (411, 421, 431, 441, 451). In this case, because the terminal ends are respectively provided in the select groove and the shift grooves, it is possible to reliably guide the projection to the terminal ends, using the inertia of the driven parts of the clutches. Moreover, because the projection is positioned at the terminal ends, the shift/select shaft can be restrained from causing a positional displacement, even though the shift/select shaft receives a counter input of its deadweight or the like.

Moreover, in some cases, the controller connects the clutch, before the shift/select shaft arrives at the terminal end position of the one of the shifting motion and the selecting motion, thereby enabling the power transmission for the other of the shifting motion and the selecting motion to be performed. In this case, by connecting the clutch for the next shifting motion, before the selecting motion is finished, thereby to drive the electric motor, it is possible to immediately start the shifting motion.

Moreover, in some cases, the controller starts to drive the electric motor for performing the other of the shifting motion and the selecting motion, according to the arrival of the shift/select shaft at the terminal end position of the one of the shifting motion and the selecting motion. In this case, before the selecting motion is finished, for example, the connection of the clutch for the next shifting motion has been completed, and therefore, it is possible to drive the electric motor to start the shifting motion, immediately after the selecting motion is finished.

Moreover, in some cases, the transmission device further comprises: a first position detecting means unit (87) configured to detect an axial position of the shift/select shaft; and a second position detecting unit (89) configured to detect a rotation position of the shift/select shaft. In this case, the respective ends of the selecting motion and the shifting motion can be detected on the basis of signals from the first and second position detecting units, and it is possible to rapidly start to drive the electric motor according to the results of the detection.

It is to be noted that numerals in parenthesis in the above description represent reference numerals corresponding to constituent elements in the embodiment, which will be described below, but these reference numerals do not restrict a scope of claims for patent.

BRIEF DESCRIPTION OF THE DRAWINGS

FIG. 6 is a schematic view of the guiding mechanism.

FIG. 7 is a timing chart of control motions.

MODE FOR CARRYING OUT THE INVENTION

Figure 1:
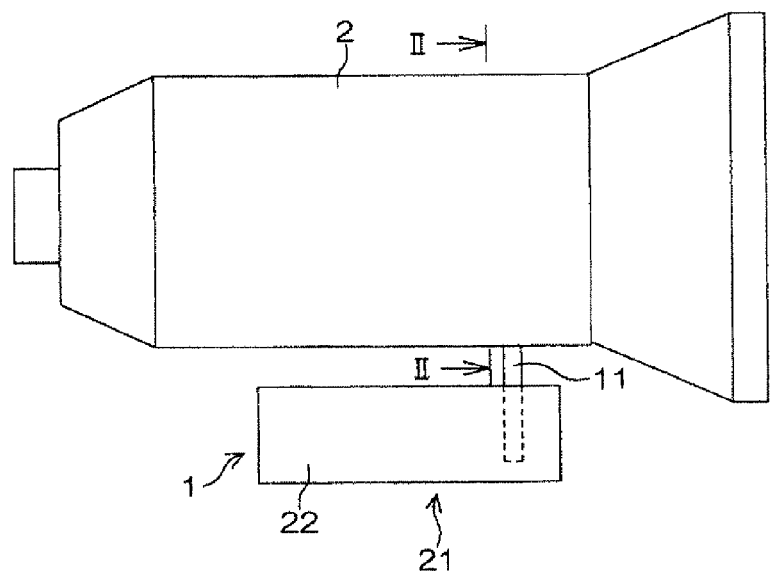
FIG. 1 is a view showing a schematic structure of a transmission device in an embodiment according to the invention.
Figure 2:
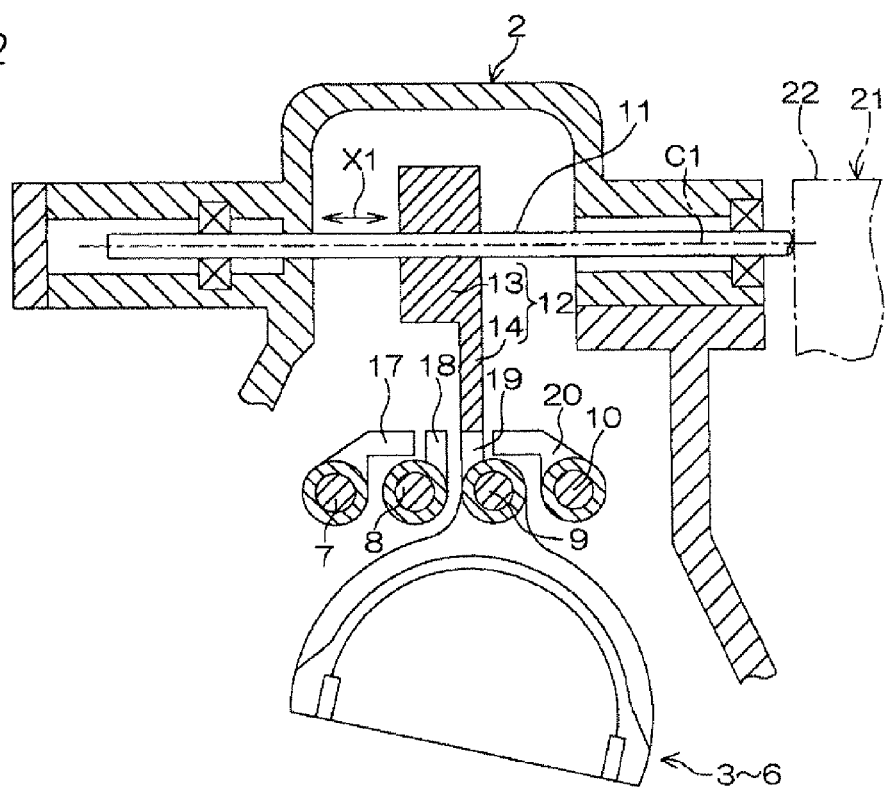
FIG. 2 is a sectional view taken along a line II-II in FIG. 1.

Now, referring to the drawings, an embodiment according to the invention will be described. FIG. 1 is a view showing a schematic structure of a transmission device 1 in the embodiment according to the invention. FIG. 2 is a sectional view taken along a line II-II in FIG. 1.

The transmission device 1 is a device to be mounted on a vehicle such as an automobile, a track, etc., and includes a gear box 2. In the gear box 2, there are provided a main shaft (not shown) as an input shaft for receiving input rotations from an engine or the like, via a clutch (not shown), and a counter shaft (not shown) extending in parallel with the main shaft, as an output shaft for transmitting output rotations to a propeller shaft or the like. These shafts are respectively provided with a plurality of shift gears (not shown) in the middle thereof. This transmission device 1 employs a constant mesh system, in which all the shift gears of the main shaft and all the shift gears of the counter shaft rotate in a state constantly meshed with each other. The shift gears mounted on the counter shaft are in a state of idle rotation.

When sleeves (not shown) which are provided around the counter shaft corresponding to the respective shift gears are moved in an axial direction of the counter shaft, the corresponding shift gears are switched between a connected state and an idle rotation state. The sleeves corresponding to the desired shift gears are engaged with shift forks 3, 4, 5, 6 (See FIG. 2. Only one of the shift forks is shown in FIG. 2), thereby to be driven by these shift forks 3 to 6. Referring to FIG. 2, a structure around the shift forks 3 to 6 in the gear box 2 will be specifically described below.

In FIG. 2, the shift forks 3 to 6 are fixed to fork shafts 7 to 10 which correspond to the shift forks one by one. The fork shafts 7 to 10 are provided in parallel with each other at a predetermined interval so as to move in the axial direction.

In vicinity of the fork shafts 7 to 10 (an upper part in FIG. 2), a shift/select shaft 11 extends in a direction perpendicular to the fork shafts 7 to 10. The shift/select shaft 11 can rotate around its center axis C1, and can move in its axial direction X1. A shift lever 12 is fixed to an intermediate part of the shift/select shaft 11. This shift lever 12 can be selectively engaged with the fork shafts 7 to 10. By rotating the shift/select shaft 11, it is possible to engage the shift lever 12 with the fork shafts 7 to 10. Specifically, the shift lever 12 includes a boss part 13 which is fixed to the shift/select shaft 11, and a protruding part 14 which is protruded from a lower end of the boss part 13. The fork shafts 7 to 10 are respectively provided with clamping parts 17, 18, 19, 20 which are projected so as to clamp the protruding part 14. These clamping parts 17 to 20 are arranged in parallel with the axial direction X1 of the shift/select shaft 11. When the protruding part 14 is clamped by either of the clamping parts 17 to 20, engagement between the shift lever 12 and the corresponding one of the fork shafts 7 to 10 is achieved.

When the shift/select shaft 11 is rotated around the center axis, the shift lever 12 is engaged with a predetermined one of the fork shafts 7, 8, 9, 10, thereby allowing the shift forks 3 to 6 to actuate the corresponding sleeves. On the other hand, when the shift/select shaft 11 is moved in the axial direction X1, the shift lever 12 also moves in parallel with the axial direction X1, thereby to change positions where the fork shafts 7 to 10 are to be engaged. As the results, the shift forks 3 to 6 to be actuated are changed. Specifically, with the rotation of the shift/select shaft 11 around the center axis C1, shifting motion for actuating the shift forks 3 to 6 is performed, and with the axial movement of the shift/select shaft 11 along the axial direction X1, selecting motion for selecting the shift forks 3 to 6 as an object to be actuated is performed.

Although a case where the four fork shafts 7 to 10 are provided has been described in this embodiment, the number of the fork shafts may be two or three, or may be five or more.

A shift/select driving device 21 for driving the shifting motion and the selecting motion inside the gear box 2 is mounted on a peripheral face (an outer face) of the gear box 2. A part of the shift/select shaft 11 at one end side (a lower side in FIG. 1, and a right end side in FIG. 2) projects outward from the gear box 2, and intrudes into a housing 22 of the shift/select driving device 21.

Figure 3:
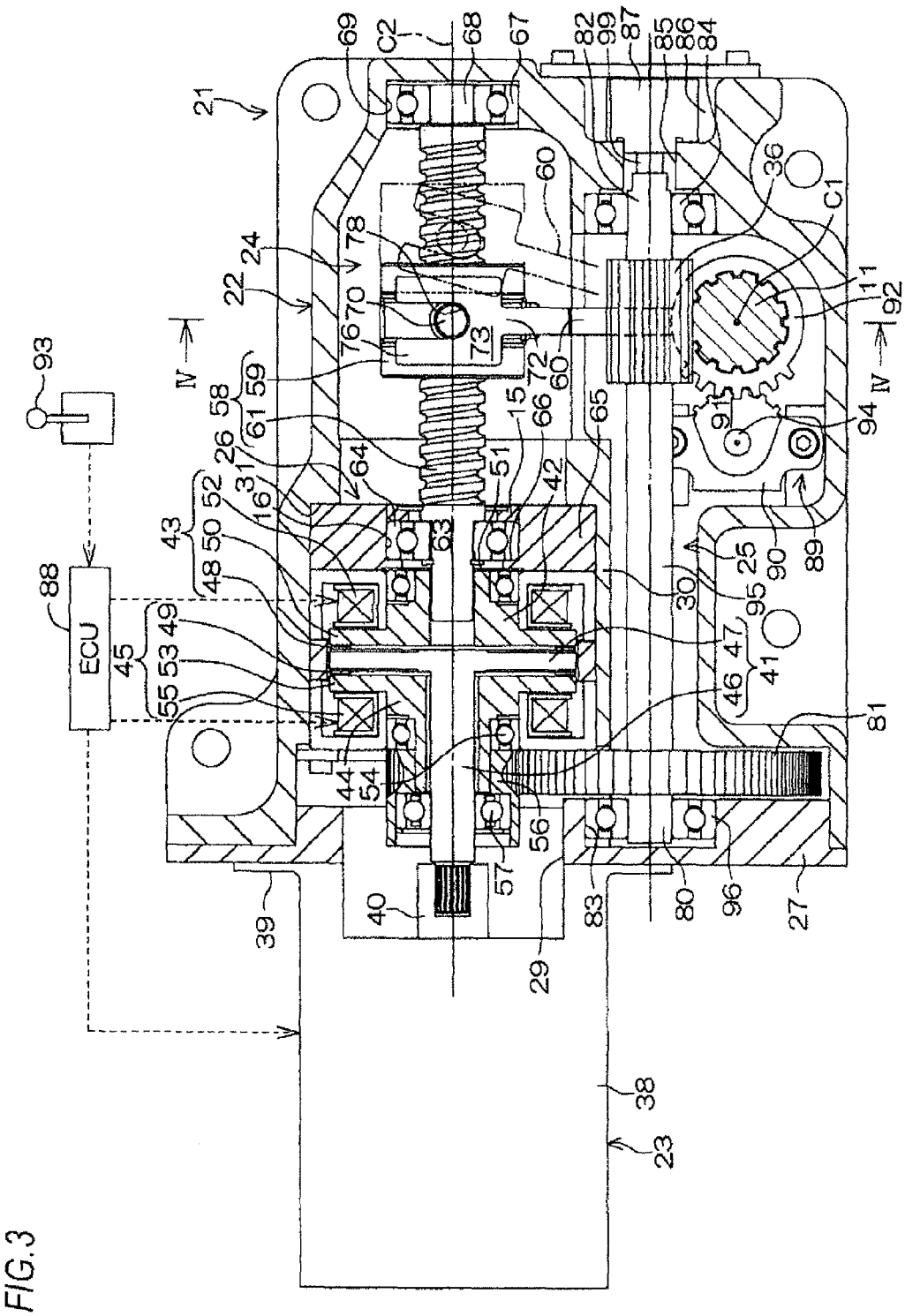
FIG. 3 is a sectional view showing a structure of a shift/select driving device in FIG. 1.
Figure 4:
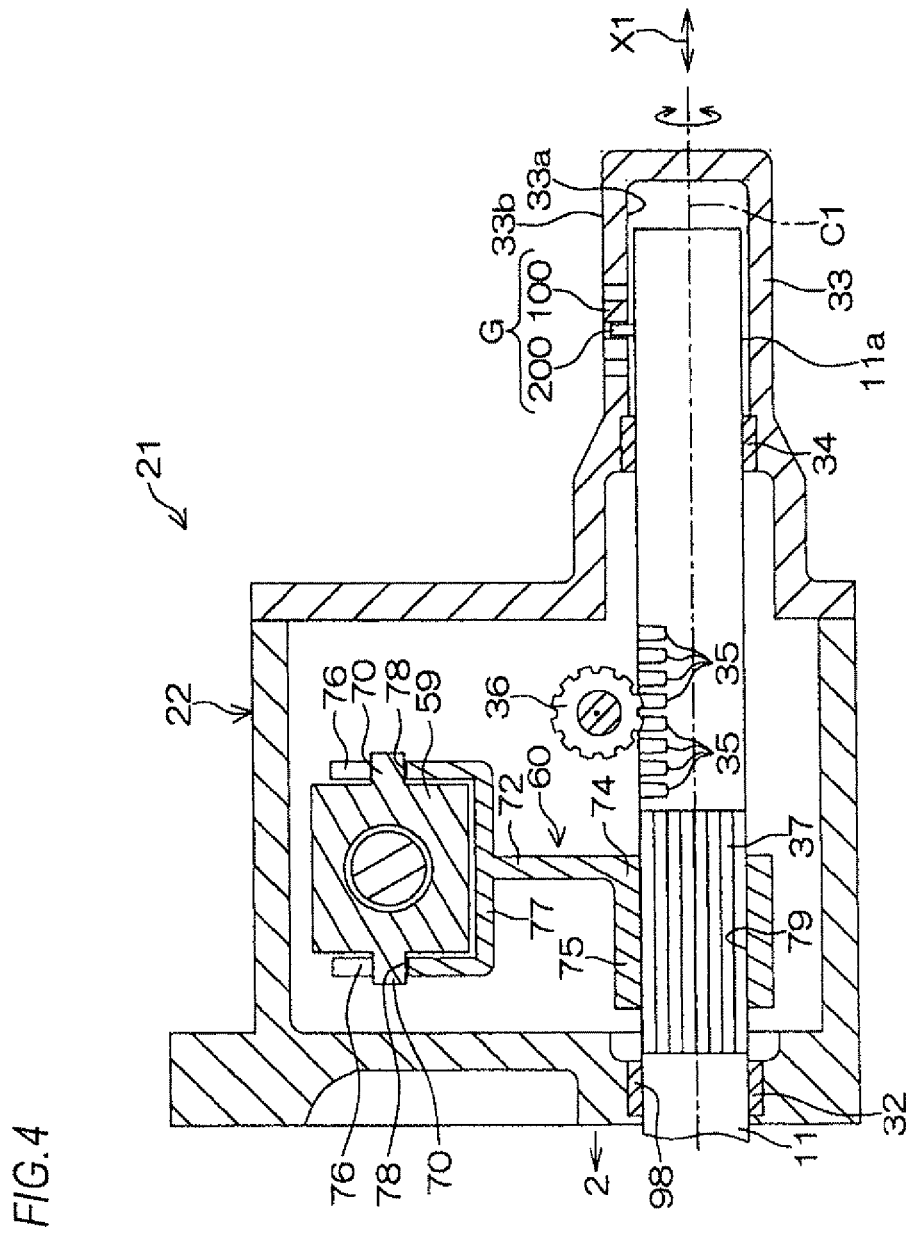
FIG. 4 is a sectional view taken along a line IV-IV in FIG. 3.

FIG. 3 is a sectional view showing a structure of the shift/select driving device 21. FIG. 4 is a sectional view taken along a line IV-IV in FIG. 3.

The shift/select driving device 21 includes an electric motor 23, a first driving power transmitting mechanism 24 which transmits a rotation driving power of the electric motor 23 as a power for the shifting motion of the shift/select shaft 11, a second driving power transmitting mechanism 25 which transmits the rotation driving power of the electric motor 23 as a power for the selecting motion of the shift/select shaft 11, and a switch unit 26 for switching destinations of the rotation driving power of the electric motor 23 between the first driving power transmitting mechanism 24 and the second driving power transmitting mechanism 25. In short, this shift/select driving device 21 constitutes an electric actuator unit, and functions as the shift/select driving device, when it is applied to the transmission device 1 as shown in this embodiment.

The first driving power transmitting mechanism 24 includes a first conversion mechanism for amplifying the rotation driving power of the electric motor 23, and converting it to a power for rotating the shift/select shaft 11 around the center axis C1. The second driving power transmitting mechanism 25 includes a second conversion mechanism for amplifying the rotation driving power of the electric motor 23, and converting it to a power for moving the shift/select shaft 11 in the axial direction X1 (See FIG. 4. It is a direction perpendicular to the drawing in FIG. 3).

The housing 22 has a bottomed cylindrical shape, and an opening of the housing 22 (at a left side in FIG. 3) is closed with a plate-like lid 27. The housing 22 and the lid 27 are formed of cast iron, aluminum, etc., for example, and an outer periphery of the lid 27 is fitted to the opening of the housing 22. The lid 27 is provided with a through hole 29 in a round shape so as to pass through an inner wall (at a right face in FIG. 3) and an outer wall (at a left face in FIG. 3).

The switch unit 26 is contained in a containing part 30 in a cylindrical shape which is provided inside the housing 22. A step part 31 for receiving the switch unit 26 is formed in one end part (a right end part in FIG. 3) of an inner peripheral face of the containing part 30. In a state where the switch unit 26 is contained at a predetermined containing position in the containing part 30, one end (a right end part in FIG. 3) of the switch unit 26 is engaged with the step part 31.

The shift/select shaft 11 is held in the housing 22 so as to rectilinearly reciprocate along the axial direction X1 (See FIG. 4. It is the direction perpendicular to the drawing, in FIG. 3), and so as to rotate. Specifically, the shift/select shaft 11 is held by a first sliding bearing 32 which is internally fitted to a through hole 98 formed in the housing 22, and a second sliding bearing 34 which is internally fitted to an inner periphery 33a of a tubular housing 33 which is swelled out, for example, from the housing 22 so as to contain one end of the shift/select shaft 11, as shown in FIG. 4.

A plurality of rack teeth 35 are formed in the axial direction on a peripheral face of the shift/select shaft 11. The rack teeth 35 are provided over a relatively long length in a circumferential direction so that engagement between the rack teeth 35 and a pinion 36 can be maintained, even when the shift/select shaft 11 makes a small amount of rotation. A spline part 37 is formed on the peripheral face of the shift/select shaft 11 at a position closer to the gear box 2 than the rack teeth 35.

Figure 5:
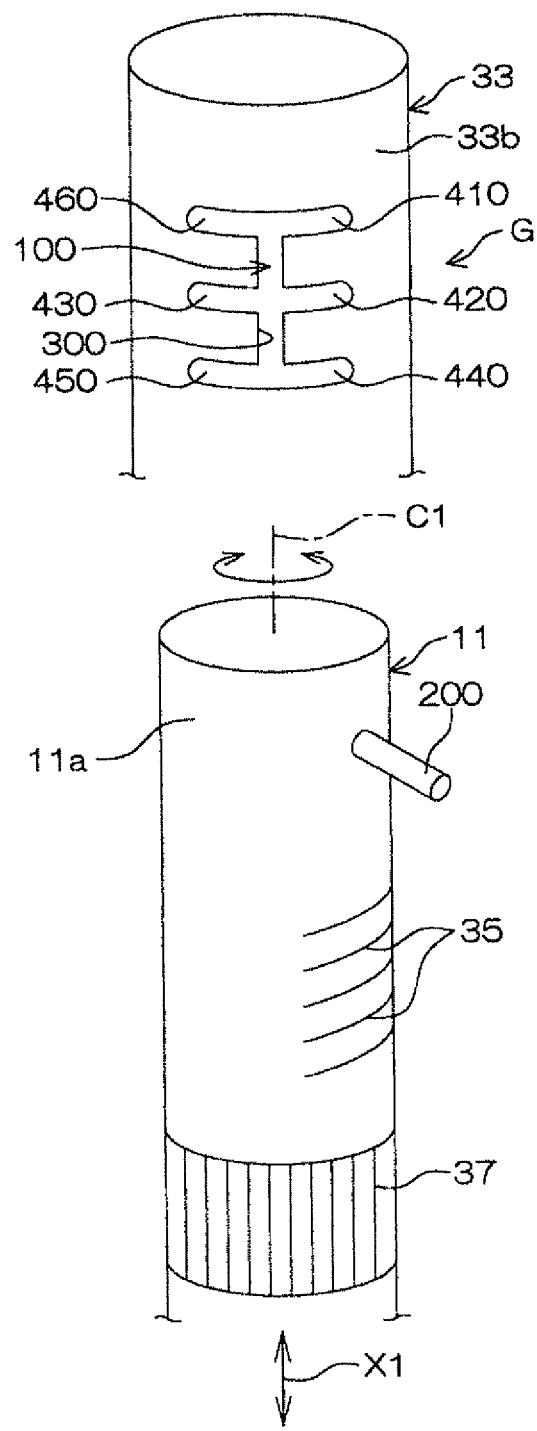
FIG. 5 is an exploded perspective view schematically showing a guiding mechanism.

As shown in FIG. 4 and FIG. 5 which is an exploded schematic perspective view, a guiding mechanism G for guiding the shifting motion and selecting motion of the shift/select shaft 11 is provided relative to the housing 22 and the shift/select shaft 11. The guiding mechanism G includes a guide groove 100 which is formed in the housing 22, and a projection 200 which is provided on the shift/select shaft 11 and adapted to be guided along the guide groove 100.

The projection 200 is a projection in a cylindrical shape, for example, which is projected outward in a radial direction from an outer periphery 11a of the shift/select shaft 11 so as to rotate following the rotation of the shift/select shaft 11 and so as to move following the movement of the shift/select shaft 11 in the axial direction X1.

The guide groove 100 is formed in the housing 33 in a shape imitating a shift pattern of a manual lever. The guide groove 100 is formed passing through the inner periphery 33a and an outer periphery 33b of the housing 33, but need not pass through the outer periphery 33b.

As shown in FIG. 6, the guide groove 100 has a select groove 300 for guiding the selecting motion of the shift/select shaft 11 by means of the projection 200. This select groove 300 extends rectilinearly in parallel with the axial direction X1 of the shift/select shaft 11. The select groove 300 has a pair of terminal ends 301, 302, and a center part 303 between the terminal ends 301, 302. When the projection 200 is positioned in the select groove 300, a gear is at a neutral position.

The guide groove 100 is extended from the select groove 300 up to respective terminal ends, and includes a first shift groove 410, a second shift groove 420, a third shift groove 430, a fourth shift groove 440, a fifth shift groove 450, and a sixth shift groove 460 for guiding the shifting motion of the shift/select shaft 11 by means of the projection 200. As shown in FIG. 5, the shift grooves 410 to 460 extend in a circumferential direction of the housing 33.

As shown in FIG. 6, the first shift groove 410 and the sixth shift groove 460 extend from the terminal end 301 of the select groove 300 in opposite directions to each other. When the projection 200 has arrived at a terminal end 411 of the first shift groove 410, the gear is at 1-speed position, and when the projection 200 has arrived at a terminal end 461 of the sixth shift groove 460, the gear is at a reverse position.

The second shift groove 420 and the third shift groove 430 extend from the center part 303 of the select groove 300 in opposite directions to each other. When the projection 200 has arrived at a terminal end 421 of the second shift groove 420, the gear is at 2-speed position, and when the projection 200 has arrived at a terminal end 431 of the third shift groove 430, the gear is at 3-speed position.

The fourth shift groove 440 and the fifth shift groove 450 extend from the terminal end 302 of the select groove 300 in opposite directions to each other. When the projection 200 has arrived at a terminal end 441 of the fourth shift groove 440, the gear is at 4-speed position, and when the projection 200 has arrived at a terminal end 451 of the fifth shift groove 450, the gear is at 5-speed position.

Referring again to FIG. 3, a brushless motor, for example, is employed as the electric motor 23. The electric motor 23 is arranged outside the housing 22. This electric motor 23 is provided with a motor housing 38 in a cup-like shape, and a rotor (not shown) and a stator (not shown) which are contained in the motor housing 38. The electric motor 23 is provided with a motor driver (not shown), and the electric motor 23 is driven to rotate by operation of this motor driver.

A flange part 39 in an annular shape is formed in a base end part (a right end part in FIG. 3) of a peripheral wall of the motor housing 38 so as to protrude outward in a radial direction from the peripheral wall. This flange part 39 is fixed to an outer face (a left face in FIG. 3) of the lid 27.

A rotation shaft 40 which is coupled to the rotor of the electric motor 23 so as to coaxially rotate together with the rotor has a rotation axis C2 which extends along one direction (a lateral direction in FIG. 3) perpendicular to the shift/select shaft 11. A distal end of the rotation shaft 40 is projected outward from the motor housing 38.

The switch unit 26 includes a driving shaft 41 which is coupled to the rotation shaft 40 of the electric motor 23 via a coupling mechanism such as a spline coupling so as to integrally rotate with the rotary shaft 40, a first output shaft 42 which is coaxially provided at one side in the axial direction (a right side in FIG. 3) of the driving shaft 41 so as to rotate, a first electromagnetic clutch 43 in an annular shape for transmitting or interrupting a rotation driving power from the driving shaft 41 to the first output shaft 42, a second output shaft 44 which is provided coaxially with the driving shaft 41 so as to rotate, and a second electromagnetic clutch 45 in an annular shape for transmitting or interrupting a rotation driving power from the driving shaft 41 to the second output shaft 44. These driving shaft 41, first output shaft 42, first electromagnetic clutch 43, second output shaft 44, and second electromagnetic clutch 45 are contained in the unit housing 22.

The driving shaft 41 includes a shaft body 46 which is coaxial with the rotation shaft 40 of the electric motor 23, and a driving hub 47 in a shape of a large diameter disc which is protruded outward in a radial direction from a distal end of the shaft body 46. This driving hub 47 has a relatively small wall thickness. A first armature 48 in a disc-like shape is provided on one face (a right side face in FIG. 3) of the driving hub 47.

Moreover, a second armature 49 in a disc-like shape is provided on the other face (a left side face in FIG. 3) of the driving hub 47.

The first output shaft 42 is in a substantially cylindrical shape, and coaxially provided at one side in the axial direction (a right side in FIG. 3) of the driving shaft 41 so as to rotate. A first output hub 50 in a shape of a large diameter disc is provided at the other end (a left end part in FIG. 3) of the first output shaft 42 so as to protrude outward in a radial direction from a cylindrical shaft body of the first output shaft 42. This first output hub 50 is arranged leaving a very small gap with respect to the first armature 48. Moreover, a first electromagnetic coil 52 of the first electromagnetic clutch 43 is fitted to an outer periphery of the first output shaft 42, at a position adjacent to the first output hub 50. The first output hub 50 is interposed between the driving hub 47 (the first armature 48) and the first electromagnetic coil 52.

The first electromagnetic clutch 43 includes the first armature 48 as a driving part, the first output hub 50 as a driven part, and the first electromagnetic coil 52. An outer periphery of the first electromagnetic clutch 43 is fixed to the housing 22. The first output shaft 42 is held by a first rolling bearing 51. An outer ring of the first rolling bearing 51 is internally fitted to an inner periphery of the first electromagnetic clutch 43. Moreover, an inner ring of the first rolling bearing 51 is externally fitted to the outer periphery of the first output shaft 42.

When a direct electric current is applied to the first electromagnetic coil 52 of the first electromagnetic clutch 43, the first electromagnetic clutch 43 is actuated, and the first armature 48 is attracted by the first electromagnetic coil 52. Then, the first armature 48 which is provided on the driving hub 47 comes into contact with the other face (a left face in FIG. 3) of the first output hub 50 thereby to be coupled thereto. In this manner, the rotation driving power (rotation torque) of the driving hub 47 (the driving shaft 41) is transmitted to the first output shaft 42. When supply of the direct electric current to the first electromagnetic coil 52 is shut off, the first armature 48 is disconnected from the first output hub 50 thereby to interrupt the transmission of the rotation driving power (torque transmission) to the first output shaft 42.

The second output shaft 44 is provided at the opposite side to the first output shaft 42 with respect to the driving hub 47, coaxially with the first output shaft 42 so as to rotate. In short, the first and second output shafts 42, 44 are arranged at both sides of the driving hub 47. The second output shaft 44 has a substantially annular shape and surrounds the driving shaft 41. A second output hub 53 in a shape of a large diameter disc is formed at the other end (a right end in FIG. 3) of the second output shaft 44 so as to protrude outward in a radial direction from its shaft body in an annular shape. This second output hub 53 is arranged leaving a very small gap with respect to the second armature 49. Moreover, a second electromagnetic coil 55 of the second electromagnetic clutch 45 is externally fitted to an outer periphery of the second output shaft 44, at a position adjacent to the second output hub 53. In other words, the second output hub 53 is interposed between the driving hub 47 (the second armature 49) and the second electromagnetic coil 55.

The second electromagnetic clutch 45 includes the second armature 49 as a driving part, the second output hub 53 as a driven part, and the second electromagnetic coil 55. An outer periphery of the second electromagnetic clutch 45 is fixed to the housing 22. The second output shaft 44 is held by a second rolling bearing 54. An inner ring of the second rolling bearing 54 is internally fixed to an inner periphery of the second electromagnetic clutch 45. Moreover, an outer ring of the second rolling bearing 54 is externally fixed to the outer periphery of the second output shaft 44.

When the direct electric current is applied to the second electromagnetic coil 55 of the second electromagnetic clutch 45, the second electromagnetic clutch 45 is actuated, and the second armature 49 is attracted by the second electromagnetic coil 55. Then, the second armature 49 which is provided on the driving hub 47 comes into contact with one face (a right face in FIG. 3) of the second output hub 53 thereby to be coupled thereto. In this manner, the rotation driving power (rotation torque) of the driving hub 47 (the driving shaft 41) is transmitted to the second output shaft 44. When supply of the direct electric current to the second electromagnetic coil 55 is shut off, the first armature 49 is disconnected from the second output hub 53 thereby to interrupt the transmission of the rotation driving power (torque transmission) to the second output shaft 44.

While the first electromagnetic clutch 43 is working, the other face of the first output hub 50 having a large diameter comes into face contact with the first armature 48, and while the second electromagnetic clutch 45 is working, the one face of the second output hub 53 having a large diameter comes into face contact with the second armature 49. As the results, it is possible to maintain high transmission efficiency in transmitting the torque from the driving shaft 41 to the first output shaft 42, and also, it is possible to maintain high transmission efficiency in transmitting the torque from the driving shaft 41 to the second output shaft 44.

Moreover, because the driving hub 47 has a relatively thin wall thickness, a distance between the first output shaft 42 and the second output shaft 44 will not be too large. As the results, an axial length of the switch unit 26 can be kept short.

A first gear (transmission mechanism) 56 in an annular shape having a relatively small diameter is externally fitted to the outer periphery of the second output shaft 44, at a position adjacent to one end side (at a left side in FIG. 3) of the second rolling bearing 54. The first gear 56 is coaxially provided with the second output shaft 44. The first gear 56 is held by a third rolling bearing 57. An outer ring of the third rolling bearing 57 is internally fitted to an inner periphery of the first bear 56. An inner ring of the third rolling bearing 57 is externally fitted to the outer periphery of the driving shaft 41.

In this embodiment, the driving shaft 41, the first and second output shafts 42, 44, the first gear 56, the first to third rolling bearings 51, 54, 57, and the first and second electromagnetic clutch 43, 45 are unitized. Therefore, it is possible to easily mount these members 41 to 45, 51, 54, 56, 57 to the housing 22, on occasion of assembling the transmission device 1.

In order to mount the switch unit 26 into the housing 22, the switch unit 26 is inserted into the containing part 30 through the opening of the housing 22. Then, the one side of the switch unit 26 is engaged with the step part 31 thereby allowing the switch unit 26 to be mounted at a predetermined containing position. In this manner, it is possible to easily mount the switch unit 26 into the housing 22.

The first driving power transmitting mechanism 24 including the first conversion mechanism is provided with a ball screw mechanism 58, and a connecting rod 60 for connecting a ball nut 59 of this ball screw mechanism 58 to the shift/select shaft 11. The ball screw mechanism 58 includes a screw shaft 61 which is connected to the first output shaft 42 and extended coaxially with this first output shaft 42, and the ball nut 59 which is attached to this screw shaft 61. The ball screw mechanism 58 converts the rotation movement of the first output shaft 42 into an axially rectilinear movement of the ball nut 59.

The screw shaft 61 is provided with male threads on an entire area thereof except both end parts. The ball nut 59 is provided with female threads (not shown) on its inner periphery. A plurality of balls (not shown) are interposed between the male threads of the screw shaft 61 and the female threads of the ball nut 59 so as to roll. A first end part 63 (a left end part in FIG. 3) of the screw shaft 61 is held by a fourth rolling bearing 64. An inner ring of the fourth rolling bearing 64 is externally fitted to the first end part 63 of the screw shaft 61.

Moreover, an outer ring of the fourth rolling bearing 64 is internally fitted to a through hole 16 passing through a bottom wall 65 of the unit housing 22. The outer ring of the fourth rolling bearing 64 is butted against an annular step part 66 thereby to be restrained from moving to one side in an axial direction (a left side in FIG. 3). Further, the outer ring of the fourth rolling bearing 64 is engaged with a lock nut 15 thereby to be restrained from moving to the other side in the axial direction (a right side in FIG. 3).

A part of the first end part 63 of the screw shaft 61 extending toward the electric motor 23 beyond the fourth rolling bearing 64 is inserted into a bore in the first output shaft 42, and connected with the first output shaft 42 so as to integrally rotate therewith. A second end part 68 (a right end part in FIG. 3) of the screw shaft 61 is held by a fifth rolling bearing 67. An inner ring of the fifth rolling bearing 67 is externally fitted to the second end part 68 of the screw shaft 61. Moreover, an outer ring of the fifth rolling bearing 67 is fixed into a cylindrical recess 69 which is formed in a bottom part of the housing 22.

The ball nut 59 has a substantially cubical shape. A pair of columnar shafts 70 (only one of them is shown in FIG. 3) extending in a direction parallel to the shift/select shaft 11 (a direction perpendicular to the drawing in FIG. 3, and a lateral direction in FIG. 4) are projected from both side faces of the ball nut 59.

The connecting rod 60 includes a first connecting part 73 which is provided in its first end part 72 (an upper end part in FIGS. 3 and 4) to be connected to the ball nut 59, and a second connecting part 75 (See FIG. 4) which is provided in its second end part 74 (an lower end part in FIGS. 3 and 4) to be connected to the shift/select shaft 11.

The first connecting part 73 is a bracket formed of metal, for example. The first connecting part 73 includes a pair of support plates 76, 76 and a connecting part 77 (See FIG. 4) for connecting respective base ends (lower ends in FIGS. 3 and 4) of the support plates 76, 76 to each other, and has a substantially tilted C-shape (a shape in which a C-shape is tilted by 90 degree) in a side view. Each of the support plates 76, 76 is provided with a U-shaped groove 78 which is cut out from a tip end edge (an upper end in FIGS. 3 and 4) and extends in an axial direction. The support plate 76 is formed in a bifurcated fork shape extending from the base end to the tip end. Each of the columnar shafts 70 is engaged with this U-shaped groove. A width of the U-shaped groove 78 is set to be such a size as corresponding to a diameter of the shaft 70, and has a substantially constant width along the axial direction of the connecting rod 60.

Because the shafts 70 are respectively engaged with the U-shaped grooves 78, the ball nut 59 is provided so as to relatively rotate around the shafts 70 with respect to the connecting rod 60. Moreover, because the shafts 70 are engaged with the U-shaped grooves 78, an engaged state between the shafts 70 and the U-shaped grooves 78 can be maintained, even though distances between the shafts 70 and the connecting rod 60 are changed. As the results, even in case where the ball nut 59 moves in the axial direction, and the distance between the ball nut 59 and the shift/select shaft 11 is changed, the engaged state between the shafts 70 and the U-shaped grooves 78 can be maintained.

The second connecting part 75 has a cylindrical shape and is externally fitted to the shift/select shaft 11. The second connecting part 75 is provided with spline grooves 79 (See FIG. 4) which are engaged with the spline part 37 formed on the peripheral face of the shift/select shaft 11. Therefore, the second connecting part 75 is connected to the shift/select shaft 11 in such a manner that its relative rotation with respect to the shift/select shaft 11 is not allowed, but its relative movement in the axial direction is allowed. Accordingly, the connecting rod 60 is so provided as to be tilted around the center axis C1 of the shift/select shaft 11. When the ball nut 59 is moved along its axial direction (a lateral direction in FIG. 3, and a direction perpendicular to the drawing in FIG. 4) following the rotation of the screw shaft 61, the connecting rod 60 is tilted around the center axis C1 of the shift/select shaft 11, as shown in FIG. 3.

The second driving power transmitting mechanism 25 includes a transmitting shaft (a transmitting mechanism) 95 which is provided in parallel with the driving shaft 41 so as to rotate, a second gear (a transmitting mechanism) 81 which is coaxially fixed to the transmitting shaft 95 at a predetermined position adjacent to a first end part 80 (a left end part in FIG. 3) of the transmitting shaft 95, and the pinion 36 having a small diameter which is coaxially fixed to the transmitting shaft 95 at a predetermined position adjacent to a second end part 82 (a right end part in FIG. 3) of the transmitting shaft 95. It is to be noted that the second gear 81 has a larger diameter than both the first gear 56 and the pinion 36.

The first end part 80 (the left end part in FIG. 3) of the transmitting shaft 95 is held by a sixth rolling bearing 96. An inner ring of the sixth rolling bearing 96 is externally fitted to the first end part 80 (the left end part in FIG. 3) of the transmitting shaft 95. Moreover, an outer ring of the sixth rolling bearing 96 is fixed into a cylindrical recess 83 which is formed on an inner face (a right face in FIG. 3) of the lid 27. The second end part 82 (the right end part in FIG. 3) of the transmitting shaft 95 is held by a seventh rolling bearing 84. An inner ring of the seventh rolling bearing 84 is externally fitted to the second end part 82 of the transmitting shaft 95. Moreover, an outer ring of the seventh rolling bearing 84 is fixed into a cylindrical recess 86 which is formed around a sensor hole 85 (described below) in the bottom part of the housing 22.

In the housing 22, there are provided a first position sensor 87 as a first position detecting unit for detecting a rotation position of the shift/select shaft 11 on the basis of a detected rotation amount of the transmitting shaft 95, and a second position sensor 89 as a second position detecting unit for detecting an axial position of the shift/select shaft 11 on the basis of a rotation amount of a second sensor shaft 94, which will be described below.

The sensor hole 85 is formed passing through a bottom wall of the housing 22. The first position sensor 87 is arranged outside the housing 22, near the bottom part of the housing 22. A tip end of a first sensor shaft 99 extending from a sensor part (not shown) is connected to the second end part 82 of the transmitting shaft 95 through the sensor hole 85 so as to integrally rotate therewith. An amount of the axial movement of the shift/select shaft 11 is detected on the basis of a rotation amount of the first sensor shaft 99 following the rotation of the shift/select shaft 11. A detected value of the first position sensor 87 is inputted to an ECU (Electronic Control Unit) 88 as a controller, and in this ECU 88, the axial position of the shift/select shaft 11 is detected on the basis of the detected value of the first position sensor 87.

The second position sensor 89 includes a main body 90 incorporating therein a sensor part (not shown), a second sensor shaft 94 connected to the sensor part, and a sector gear 91 to which the second sensor shaft 94 is externally fixed. This sector gear 91 is meshed with a sensor gear 92 which is externally fitted to the shift/select shaft 11. On the basis of the rotation amount of the second sensor shaft 94 which is detected by the second position sensor 89, the rotation amount of the shift/select shaft 11 is detected. The detected value of the second position sensor 89 is inputted into the ECU 88. In this ECU 88, the rotation position of the shift/select shaft 11 is detected on the basis of the detected value of the second position sensor 89.

When a shift knob 93 of a vehicle is operated, a signal from an operation detecting sensor of the shift knob 93 is inputted to the ECU 88. The ECU 88 controls to drive the electric motor 23 via a motor driver (not shown). Moreover, the ECU 88 controls to drive the first and second electromagnetic clutches 43, 45 via a relay circuit (not shown).

In this shift/select driving device 21, when the electric motor 23 is driven to rotate, the driving shaft 41 is rotated. On this occasion, in a state where the first and second electromagnetic clutches 43, 45 are not working, the driving shaft 41 idly rotates, and so, the rotation driving power of the electric motor 23 is not transmitted to the first and second output shafts 42, 44.

When the first electromagnetic clutch 43 is actuated thereby to apply the rotation driving power from the electric motor 23 to the first output shaft 42, the screw shaft 61 is rotated following the rotation of the first output shaft 42, and the ball nut 59 fixed to the screw shaft 61 moves in the axial direction. Then, along with the axial movement of the ball nut 59, the connecting rod 60 is tilted around the center axis C1 of the shift/select shaft 11. Because the second connecting part 75 of the connecting rod 60 is provided on the shift/select shaft 11 so that the relative rotation is not allowed, the shift/select shaft 11 is rotated along with the tilting motion of the connecting rod 60. In this manner, the shifting motion is achieved.

Moreover, when the second electromagnetic clutch 45 is actuated in a state where the electric motor 23 is driven to rotate, and the rotation driving power of the electric motor 23 is applied to the second output shaft 44, the rotation driving power of the second output shaft 44 is transmitted to the pinion 36 via the first gear 56, the second gear 81, and the transmitting shaft 95. Because the pinion 36 is meshed with the rack teeth 35, the shift/select shaft 11 moves in the axial direction along with the rotation of the pinion 36. In other words, the rotation driving power of the pinion 36 is converted to the axial movement of the shift/select shaft 11. In this manner, the selecting motion is achieved.

Specifically, while the first electromagnetic clutch 43 is working, the shift/select shaft 11 is driven to rotate, and while the second electromagnetic clutch 45 is working, the shift/select shaft 11 moves in the axial direction. Therefore, by selectively operating the first and second electromagnetic clutches 43, 45, the shifting motion and the selecting motion can be individually conducted. In this manner, it is possible to perform the shifting motion and the selecting motion, using the one electric motor 23.

Now, a flow of the control by the ECU 88 concerning the operations of the electric motor 23, and the first and second electromagnetic clutch 43, 45 will be described, referring to a timing chart as shown in FIG. 7.

As shown in FIG. 6, in a process of gear change from the 3-speed to the 4-speed, for example, the projection 200 is displaced to a position of the 4-speed at the terminal end 441 of the fourth shift groove 440, via a path from the center part 303 of the select groove 300, as shown by a blank arrow mark D2, and via a path from the terminal end 302 of the select groove 300, as shown by a blank arrow mark E4. FIG. 7 shows the position of the projection 200 on this occasion, and the operations of the electric motor 23, and the first and second electromagnetic clutches 43, 45.

As a first step, the second electromagnetic clutch 45 for the selecting motion is connected, at a timing t1 where the projection 200 is present at the center part 303 of the select groove 300, and the electric motor 23 starts to be driven for the selecting motion, at a timing t2 after a predetermined period has passed from the timing t1. The electric motor 23 is accelerated for a period from the timing t2 to a timing t3 after a predetermined period has passed from the timing t2, and attains a stationary rotation, at the timing t3. The stationary rotation is continued for a period from the timing t3 to a timing t4 after a predetermined period has passed from the timing t3, and thereafter, the electric motor 23 starts to be decelerated at the timing t4.

At a timing t5 after a predetermined period has passed from the timing t4 where the electric motor 23 for the selecting motion starts to be decelerated, the second electromagnetic clutch 45 is shut off, and at the same time, the electric motor 23 is stopped (the rotation speed comes to zero). At the timing t5, the projection 200 has not yet arrived at the terminal end 302 of the select groove 300. In short, the selecting motion of the shift/select shaft 11 is not completed.

Even though the power transmission to the shift/select shaft 11 is interrupted by shutting off the second electromagnetic clutch 45, the shift/select shaft 11 is moved up to the position where the selecting motion is completed, with an inertia of the second output hub 53 which is the driven part of the second electromagnetic clutch 45. The projection 200 arrives at the terminal end 302 of the select groove 300, at a timing t7 after a predetermined period has passed from the timing t5 where the second electromagnetic clutch 45 is shut off. In spite of the inertia, the projection 200 can be reliably positioned and stopped at the terminal end 302.

On the other hand, the first electromagnetic clutch 43 is connected for the next shifting motion, at a timing t6 after a predetermined period has passed from the timing t5 where the second electromagnetic clutch 45 is shut off, and before the timing t7 where the projection 200 arrives at the terminal end 302 of the select groove 300.

Then, the electric motor 23 starts to be driven for the shifting motion, at the timing t7 where the projection 200 arrives at the terminal end 302 of the select groove 300 (This is detected by the first position sensor 87), that is, at the same time when the selecting motion of the shift/select shaft 11 is completed. In this manner, the shifting motion of the shift/select shaft 11 is started.

The electric motor 23 is accelerated for a period from the timing t7 to a timing t8 after a predetermined period has passed from the timing t7, and attains a stationary rotation at the timing t8. The stationary rotation is continued for a period from the timing t8 to a timing t9 after a predetermined period has passed from the timing t8, and thereafter, the electric motor 23 starts to be decelerated at the timing t9.

At a timing t10 after a predetermined period has passed from the timing t9 where the electric motor 23 for the shifting motion starts to be decelerated, the first electromagnetic clutch 43 is shut off, and at the same time, the electric motor 23 is stopped (the rotation speed comes to zero). At the timing t10, the projection 200 has not yet arrived at the terminal end 441 of the fourth shift groove 440. In short, the shifting motion of the shift/select shaft 11 is not completed.

Even though the power transmission to the shift/select shaft 11 is interrupted by shutting off the first electromagnetic clutch 43, the shift/select shaft 11 is moved up to the position where the shifting motion is completed, with an inertia of the first output hub 50 which is the driven part of the first electromagnetic clutch 43. The projection 200 arrives at the terminal end 441 of the fourth shift groove 440, at a timing t11 after a predetermined period has passed from the timing t10 where the first electromagnetic clutch 43 is shut off. In spite of the inertia, the projection 200 can be reliably positioned and stopped at the terminal end 441 of the fourth shift groove 440.

It is to be noted that also on occasion where the projection 200 moves to the terminal end 301 of the select groove 300 (See an arrow mark D1) in the selecting motion, as well as on the occasion where the projection 200 moves to the terminal end 302 of the select groove 300 (See the arrow mark D2), as described above, the second electromagnetic clutch 45 is controlled to be shut off, while the electric motor 23 is decelerated and before the selecting motion is finished.

Moreover, on occasion where the projection 200 moves to the terminal ends 441 to 451 of the corresponding shift grooves 410 to 450 (See the arrow marks E1 to E5) in the respective shifting motions to the 1-speed, 2-speed, 3-speed, 4-speed and 5-speed, the first electromagnetic clutch 43 is controlled to be shut off, while the electric motor 23 is decelerated and before the shifting motion is finished.

According to this embodiment, the second electromagnetic clutch 45 is shut off, while the electric motor 23 is decelerated and before the selecting motion is finished, for example, and thereafter, the shift/select shaft 11 is moved to the terminal position of the selecting motion with the inertia of the second output hub 53 as the driven part of the second electromagnetic clutch 45. Therefore, it is possible to connect the first electromagnetic clutch 43 for the next shifting motion, before the selecting motion is finished. As the results, it is possible to drive the electric motor 23 simultaneously with the end of the selecting motion or immediately in response to the end of the selecting motion thereby to start the next shifting motion. In this manner, quick gear changes can be performed.

Specifically, before the projection 200 of the shift/select shaft 11 arrives at either of the terminal ends 301, 302 of the select groove (specifically, at the timing t6 earlier than the timing t7 where the selecting motion is finished, as shown in FIG. 7), the first electromagnetic clutch 43 is connected for realizing the power transmission for the shifting motion. In other words, the first electromagnetic clutch 43 is connected for the next shifting motion, before the selecting motion is finished, and hence, by driving the electric motor 23 thereafter, the shifting motion can be immediately started.

Moreover, because the shifting motion and the selecting motion can be performed using the single electric motor 23, it is possible to simplify the structure and to reduce the production cost. Even though the single electric motor 23 is used as described above, it is possible to reduce the time required for switching operation between the selecting motion and the shifting motion, and to proceed to the next motion at an early time.

Moreover, on occasion where the projection 200 moves to the terminal ends of the respective shift grooves 410 to 460, the first electromagnetic clutch 43 is shut off, while the electric motor 23 is decelerated and before the shifting motion is finished, and thereafter, the shift/select shaft 11 can be moved to the terminal position of the shifting motion, with the inertia of the first output hub 50 as the driven part of the first electromagnetic clutch 43.

In the selecting motion and the shifting motion where the projection 200 moves to the respective terminal ends, the corresponding electromagnetic clutches 43, 45 are shut off, before the ends of the respective motions. Therefore, it is possible to reduce the driving time of the electric motor 23 to the least as possible, and to contribute to energy saving.

Moreover, the guiding mechanism G for guiding the shifting motion and the selecting motion of the shift/select shaft 11 is provided. In the guiding mechanism G, the projection 200 projecting from the shift/select shaft 11 is guided along the guide groove 100 which is formed in the housing 33. The guide groove 100 has a shape imitating a shift pattern of a manual lever, and includes the select groove 300 extending in parallel with the shift/select shaft 11 and having a pair of the terminal ends 301, 302, and a plurality of the shift grooves 410, 420, 430, 440, 450 extending transversely from the select groove 300 up to the corresponding terminal ends 411, 421, 431, 441, 451. Because the terminal ends are respectively provided in the select groove 300 and the shift grooves 410 to 460 in this manner, it is possible to reliably guide the projection 200 to the terminal ends to stop there, using the inertias of the output hubs 50, 53 as the driven parts of the electromagnetic clutches 43, 45. Moreover, because the projection 200 is positioned at the terminal ends, the shift/select shaft 11 can be restrained from causing a positional displacement, even though the shift/select shaft 11 receives a counter input of its deadweight or the like.

Moreover, in response to the arrival of the shift/select shaft 11 at the terminal ends of the selecting motion, the electric motor 23 starts to be driven for the shifting motion. Specifically, before the selecting motion is finished, the connection of the first electromagnetic clutch 43 for the next shifting motion has been completed. As the results, it is possible to drive the electric motor 23 to start the shifting motion, simultaneously with the end of the selecting motion, or immediately after the end of the selecting motion.

Because the respective terminal end positions of the selecting motion and the shifting motion can be detected, using the first position sensor 87 and the second position sensor 89, it is possible to reliably detect the ends of the shifting motion and the selecting motion. Therefore, according to the detection of the ends, it is possible to rapidly start to drive the electric motor 23 for the next motion.

The invention is not limited to the above described embodiment. For example, in the above described embodiment, the projection 200 which is provided on the outer periphery 11a of the shift/select shaft 11 is guided along the guide groove 100 which is provided in the housing 33, as the guiding mechanism G. However, it is also possible to use such a guiding mechanism that a projection is provided on the inner periphery of the housing 33, and a groove for guiding the projection is provided on the outer periphery 11a of the shift/select shaft 11. Various other modifications can be made within a scope of claims of the invention.

The invention claimed is:

1. A transmission device comprising:
a single electric motor;
clutches capable of connecting or shutting off power transmission from the electric motor;
a controller configured to control motions of the electric motor and the clutches;
a shift/select shaft configured to be rotated around its center axis thereby to perform a shifting motion, and configured to be moved in an axial direction thereby to perform a selecting motion;
a first driving power transmitting mechanism configured to allow the shift/select shaft to perform the shifting motion using a power from the electric motor via one of the clutches;

a second driving power transmitting mechanism configured to allow the shift/select shaft to perform the selecting motion using a power from the electric motor via the other of the clutches; and a guiding mechanism configured to guide the selecting motion and the shifting motion of the shift/select shaft up to respective terminal end positions, wherein the controller shuts off the clutch at a predetermined timing when the electric motor is decelerated and before the shift/select shaft arrives at the terminal end position of one of the shifting motion and the selecting motion, and moves the shift/select shaft up to the terminal end position of the one of the shifting motion and the selecting motion with an inertia of a driven part of the clutch.

2. The transmission device according to claim 1, further comprising a housing containing at least a part of the shift/select shaft, wherein the guiding mechanism includes a projection which is projected from one of an outer periphery of the shift/select shaft and an inner face of the housing, and a groove which is provided on the other of the outer periphery of the shift/select shaft and the inner face of the housing and which is configured to guide the projection or configured to be guided by the projection, and the groove includes a select groove extending in parallel with the shift/select shaft and having a pair of terminal ends, and a plurality of shift grooves extending transversely from the select groove and having respective terminal ends.

3. The transmission device according to claim 1, wherein the controller connects the clutch, before the shift/select shaft arrives at the terminal end position of the one of the shifting motion and the selecting motion, thereby enabling the power transmission for the other of the shifting motion and the selecting motion to be performed.

4. The transmission device according to claim 3, wherein the controller starts to drive the electric motor for performing the other of the shifting motion and the selecting motion, in response to arrival of the shift/select shaft at the terminal end position of the one of the shifting motion and the selecting motion.

5. The transmission device according to claim 4, further comprising: a first position detecting unit configured to detect an axial position of the shift/select shaft; and a second position detecting unit configured to detect a rotation position of the shift/select shaft.

6. The transmission device according to claim 2, wherein the controller connects the clutch, before the shift/select shaft arrives at the terminal end position of the one of the shifting motion and the selecting motion, thereby enabling the power transmission for the other of the shifting motion and the selecting motion to be performed.

7. The transmission device according to claim 6, wherein the controller starts to drive the electric motor for performing the other of the shifting motion and the selecting motion, in response to arrival of the shift/select shaft at the terminal end position of the one of the shifting motion and the selecting motion.

8. The transmission device according to claim 7, further comprising: a first position detecting unit configured to detect an axial position of the shift/select shaft; and a second position detecting unit configured to detect a rotation position of the shift/select shaft.

* * * * *